Patented Dec. 1, 1936

2,062,404

UNITED STATES PATENT OFFICE 2,062,404

MANUFACTURE OF CYCLIC ETHERS OF POLYHYDRIC ALCOHOLS

Henry Dreyfus, London, England

No Drawing. Application December 15, 1932, Serial No. 647,432. In Great Britain January 5, 1932

3 Claims. (Cl. 260—54)

This invention relates to the manufacture of condensation products, and is more particularly directed to the manufacture of cyclic ethers of trihydric or polyhydric alcohols and derivatives thereof.

I have discovered that excellent yields of cyclic ethers can be obtained by condensing an alcohol containing at least one ester or ether group and at least two hydroxy groups, with itself, with other polyhydric, including dihydric, alcohols, or with an aliphatic aldehyde or ketone. I have found that the partially etherified or esterified polyhydric alcohols in fact undergo condensation more readily than the corresponding un-etherified or un-esterified substances. Thus unesterified cyclic ethers which are not very readily obtainable by direct condensation may be obtained in large yields by first producing, for example, the corresponding esterified cyclic ethers as described hereafter, and then hydrolyzing them. Thus the new cyclic ethers of the invention are of considerable utility as intermediates in the production of other cyclic ethers, besides having other important uses some of which are referred to below.

Preferably in the case of using partially esterified glycerine or other polyhydric alcohol the ester groups are such that they are not easily hydrolyzed in the presence of the dehydrating agent employed, and particularly in presence of acid dehydrating agents. The esters employed may be inorganic, e. g. glycerol monochlorhydrin, or organic. I have found that the esters of organic acids, for example acetic acid, propionic acid, lauric acid, oleic acid, myristic acid, palmitic acid and stearic acid are very suitable. The extent of the esterification or etherification of the glycerine or other polyhydric alcohol should be such as to leave at least two hydroxy groups free.
Thus, for instance, I may employ as starting materials for the present invention monoacetin, monolaurin, mono-olein, monopalmitin, monostearin and erythrite diacetate.

As previously indicated the said partially esterified or etherified tri- or polyhydric alcohols may be used alone as the starting materials for the manufacture of cyclic ethers or may be mixed with glycols or other polyhydric and alcohols or aldehydes or ketones, for instance ethylene glycol, 1,2 or 1,3-propylene glycol, 1,2 or 2,3-butylene glycol, isobutylene glycol, diethylene glycol, formaldehyde, acetaldehyde, acrolein, benzaldehyde, cyclohexanone or acetone. Halogenated derivatives of such substances may also be employed, e. g. benzal chloride, diphenyl-dichlormethane and chloracetol. Furthermore, irrespective of whether a glycol, aldehyde or ketone or halogenated derivative thereof is used in conjunction with the partially etherified or esterified tri- or polyhydric alcohol, a mixture of different partially etherified or esterified tri- or polyhydric alcohols may be used. For example erythrite diacetate may be condensed with monoacetin so as to form a body which is probably 1,4-tetramethylene-dioxide-tricarbinyl-triacetate having the formula

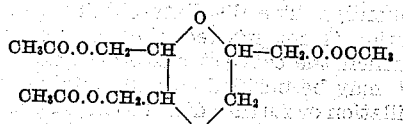

or the tricarbinol corresponding thereto. Again a mixture of partially etherified and partially esterified alcohols may be used, as for instance glycerine mono-methyl or ethyl ether with monoacetin. Such a mixture may yield a product of the type 1,4-tetramethylene-dioxide-carbinyl-acetate-carbinol-alkyl ether, for example having the formula

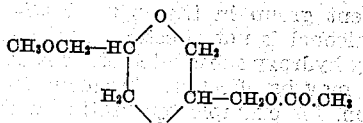

which appears to have better solvent properties than either the corresponding dicarbinol monoacetate or the corresponding dicarbinol dialkyl ether.

The dehydration to produce the cyclic ether compounds may be carried out with the aid of any suitable agent promoting or assisting the reaction. Acid dehydrating agents, for example sulphuric acid, hydrochloric acid, phosphoric acid, zinc chloride, sodium bi-sulphate, benzene sulphonic acid, and other agents having a relatively high avidity for water may be employed, since it is of advantage to limit the possibility of hydrolysis of the ester or ether group present in the initial material as much as possible or at least during the early stages of the formation of the cylic ether compound. Among other suitable substances may be mentioned chlorides, e. g. calcium, magnesium or sodium chloride, calcium carbonate and alumina, and mixtures of the above substances. When halogenated compounds are condensed with the partially esterified or etherified polyhydric alcohol alkaline assisting agents, e. g. calcium carbonate or sodium hydroxide, may be employed, particularly when partial ethers are used, or if it is desired to obtain cyclic ethers containing free hydroxy groups. It will be noted that the present invention does not exclude carrying out the condensation under such conditions that hydrolysis of the ester or ether group takes place so as to produce either a hydroxy cyclic ether, or so that the condensation goes still farther so as to produce a completely cyclic ether corresponding with the completely cyclic ether obtainable from unsubstituted glycerine or other trihydric or polyhydric alcohol.

The reaction may be carried out by heating the reactants alone or in the presence of a suitable assisting agent and the temperature may be controlled so that the condensation product remains in the reaction mixture and is removed therefrom after completion of the reaction or so that the reaction is continuous, the product distilling over and further quantities of reagents being added as required. An inert reaction medium, e. g. benzene, toluene or other hydrocarbon, may be employed, and the inert medium and temperature may be so chosen that water or volatile by-products are removed, e. g. as an azeotropic mixture, while the condensation products remain behind in the reaction mixture.

As mentioned above, the cyclic ethers may be distilled from the reaction product or removed therefrom by any suitable means. Distillation may take place continuously with the condensation or subsequently. The distillate obtained, or where distillation is not effected, the reaction mixture, from which the catalyst has preferably been removed, may be purified in any suitable manner. A distillation or further distillation is often of advantage. Aldehydic or ketonic by-products may be suitably removed, as for example by means of bisulphites, and water may be removed by means of dehydrating agents and/or with the aid of substances, such as benzene, toluene and methylene chloride, capable of forming azeotropic mixtures with the water.

Where the condensation has been carried out under such conditions that the hydrolysis of the substituent group in the original tri- or polyhydric alcohol is not effected, then if the corresponding hydroxy substituted ether is desired hydrolysis may be effected subsequent to the condensation, for example by treating with acid or alkaline hydrolyzing agents.

The following examples are given by way of illustration, but it is to be understood that they do not limit the invention in any way.

Example 1

110 parts of glycerol mono-chlorhydrin are heated with about 70–80 parts of ethylene glycol in the presence of several times their volume of xylene and of about 10 parts of sulphuric acid. The temperature is controlled so that xylene distills over slowly, further quantities being, if necessary, added. In this manner water and any volatile by-products may be removed. After several hours or when water ceases to be carried over the heating is stopped, the mixture is saturated with potassium carbonate and then fractionated. If desired, the reaction mixture may be extracted with ether, and the ethereal extract then fractionated.

Example 2

Equimolecular proportions of monoacetin and glycerine mono-methyl ether are heated at about 200° C. for several hours in the presence of about 5% by weight of calcium chloride and 10% by weight of calcium carbonate. The dehydrating agent is then separated and the reaction mixture may be either fractionated direct or extracted with ether or other suitable solvent, the extract being then fractionated.

Example 3

An aqueous solution of erythritol diacetate and acetaldehyde containing about 1½ molecular proportions of acetaldehyde to 1 molecular proportion of diacetate is saturated with HCl and kept at a moderate temperature for several hours. The mixture is then saturated with potassium carbonate and the condensation product is extracted with ether and separated by fractional distillation.

Example 4

Monostearin is refluxed for several hours with excess of benzaldehyde in the presence of about 5% $CaCl_2$ and the reaction mixture is then treated with sodium bisulphite to fix the unused aldehyde, and it is then extracted with ether and the extract is fractionally distilled The cyclic ethers, whether containing ester or ether or hydroxy groups or not, are very valuable by reason of their solvent, softening and plasticizing action upon cellulose esters and ethers and other lacquer bases, for instance cellulose acetate, nitrate, formate, propionate, butyrate, nitro-acetate and methyl, ethyl and benzyl celluloses. In conjunction with these bodies they may be used for the manufacture of dopes, varnishes and other coating compositions with or without the aid of other solvents, diluents, or plasticizing agents, fillers, pigments and the like, for the manufacture of plastic masses and molding powders and for the preparation of spinning solutions for manufacturing artificial filaments, ribbons, films, foils, sheets and the like by dry or wet methods. As already indicated cyclic ethers containing both external ether and ester groups are particularly valuable.

The cyclic ethers may be used for the treatment of already formed articles made of or containing cellulose esters or ethers, for example to prevent the liability of fabrics to slip, split or ladder, to improve the knotting properties of filaments and horse-hair, and to improve the extension of filaments or the like, particularly those of low extension produced by wet spinning processes or of those produced by the stretching of dry-spun products. They may be used to facilitate stretching of dry or wet-spun products and they may be used in sizes for lubrication of yarns, particularly for facilitating textile operations, such as winding, winding and twisting, beaming and the like. The cyclic ethers containing external ester groups of higher fatty acids or naphthenic acids, for example oleic, stearic or palmitic acid, are particularly suitable for this purpose. Such cyclic ethers may be produced for example directly from the esterified glycerine or other polyhydric alcohol, for example from mono-olein, monostearin or monopalmitin, or the ester groups may be introduced into the corresponding external hydroxylated cyclic ethers after condensation, and if necessary removal of existing ester groups.

What I claim and desire to secure by Letters Patent is:—

1. Process for the manufacture of a cyclic ether, which comprises reacting under dehydrating conditions with itself a mono-organic ester of glycerine and hydrolyzing the free ester groups contained in the product.

2. Process for the manufacture of cyclic ether, which comprises reacting under dehydrating conditions with itself an aliphatic alcohol containing at least one ester group and at least two hydroxy groups, hydrolyzing the free ester groups, and continuing the condensation to form a cyclic ether free from unsubstituted hydroxyl groups.

3. Process for the manufacture of a cyclic ether, which comprises reacting under dehydrating conditions with itself, a mono-organic ester of glycerine and, as a continuous operation, hydrolyzing the free ester groups and continuing the condensation to form cyclic ethers free from unsubstituted hydroxyl groups.

HENRY DREYFUS.

Certificate of Correction

Patent No. 2,062,404. December 1, 1936.

HENRY DREYFUS

It is hereby certified that error appears in the printed specification of the above numbered patent requiring correction as follows: Page 1, first column, line 48, for the words "and alcohols or" read *alcohols and/or*; and that the said Letters Patent should be read with this correction therein that the same may conform to the record of the case in the Patent Office.

Signed and sealed this 19th day of January, A. D. 1937.

[SEAL]

HENRY VAN ARSDALE,
*Acting Commissioner of Patents.*